(12) United States Patent
Quentin et al.

(10) Patent No.: US 11,621,831 B2
(45) Date of Patent: Apr. 4, 2023

(54) METHODS AND DEVICES FOR THE SECURE TRANSMISSION OF DATA BETWEEN A TERMINAL, AND A CARD READER, AND CORRESPONDING COMPUTER PROGRAM PRODUCT

(71) Applicant: INGENICO GROUP, Paris (FR)

(72) Inventors: Pierre Quentin, Enghien les Bains (FR); Mamoudou Sylla, Paris (FR)

(73) Assignee: INGENICO GROUP, Paris (FR)

( * ) Notice: Subject to any disclaimer, the term of this patent is extended or adjusted under 35 U.S.C. 154(b) by 333 days.

(21) Appl. No.: 16/637,561

(22) PCT Filed: Aug. 9, 2018

(86) PCT No.: PCT/EP2018/071698
§ 371 (c)(1),
(2) Date: Feb. 7, 2020

(87) PCT Pub. No.: WO2019/030356
PCT Pub. Date: Feb. 14, 2019

(65) Prior Publication Data
US 2020/0259824 A1    Aug. 13, 2020

(30) Foreign Application Priority Data
Aug. 10, 2017   (FR) ...................................... 1757645

(51) Int. Cl.
*H04L 9/08*    (2006.01)
*G06F 21/34*   (2013.01)
(Continued)

(52) U.S. Cl.
CPC .............. *H04L 9/083* (2013.01); *G06F 21/34* (2013.01); *G06Q 20/3278* (2013.01);
(Continued)

(58) Field of Classification Search
CPC ....................................................... H04L 9/083
See application file for complete search history.

(56) References Cited

U.S. PATENT DOCUMENTS 9,324,100 B2    4/2016  Sather et al.
2005/0278776 A1* 12/2005 Kitagawa ................ G06F 21/35
                                                  235/382

(Continued)

FOREIGN PATENT DOCUMENTS

| CN | 106712962 A | * | 5/2017 | ........... H04L 9/3236 |
| CN | 106712962 A | * | 5/2017 | ........... H04L 9/3236 |
| EP | 2874421 A1  |   | 5/2015 | |

OTHER PUBLICATIONS

International Search Report dated Sep. 4, 2018 for corresponding International Application No. PCT/EP2018/071698, filed Aug. 9, 2018.

(Continued)

*Primary Examiner* — Bradley W Holder
(74) *Attorney, Agent, or Firm* — David D. Brush; Westman, Champlin & Koehler, P.A.

(57) ABSTRACT

A method of secure reception, in a card reader, of a piece of data entered into a terminal connected to the card reader. The method includes the following acts by the card reader: obtaining an encipherment reader key from the card reader; encrypting the encipherment reader key by using an authentic encipherment key shared between the card reader and an authentication server, delivering an encrypted reader key; sending the encrypted reader key to the authentication server for transmission of the reader key from the authentication server to the terminal; receiving an encrypted key sent by the authentication server, resulting from an encryption of a terminal key, obtained by the authentication server, by using the authentic key; and receiving encrypted data sent by the terminal, resulting from an encryption, by using at least the (Continued)

reader key and of the terminal key, of the at least one piece of data.

8 Claims, 3 Drawing Sheets

(51) Int. Cl.
    *G06Q 20/32*     (2012.01)
    *G06Q 20/40*     (2012.01)
    *H04L 9/40*     (2022.01)

(52) U.S. Cl.
    CPC ... *G06Q 20/4012* (2013.01); *G06Q 20/40975* (2013.01); *H04L 9/0841* (2013.01); *H04L 63/045* (2013.01); *H04L 63/0853* (2013.01)

(56) References Cited

U.S. PATENT DOCUMENTS

2010/0027046 A1*   2/2010   Maeda .................. G06K 15/02
                                                                                   358/1.14
2013/0119130 A1    5/2013   Braams
2013/0328801 A1   12/2013   Quigley et al.

OTHER PUBLICATIONS

Written Opinion of the International Searching Authority dated Sep. 4, 2018 for corresponding International Application No. PCT/EP2018/071698, filed Aug. 9, 2018.

English translation of the Written Opinion of the International Searching Authority dated Sep. 18, 2018 for corresponding International Application No. PCT/EP2018/071698, filed Aug. 9, 2018.

* cited by examiner

METHODS AND DEVICES FOR THE SECURE TRANSMISSION OF DATA BETWEEN A TERMINAL, AND A CARD READER, AND CORRESPONDING COMPUTER PROGRAM PRODUCT

CROSS-REFERENCE TO RELATED APPLICATIONS

This Application is a Section 371 National Stage Application of International Application No. PCT/EP2018/071698, filed Aug. 9, 2018, which is incorporated by reference in its entirety and published as WO 2019/030356 A1 on Feb. 14, 2019, not in English.

1 TECHNICAL FIELD

The field of the invention is that of the processing of transactional data implemented especially within the framework of a payment operation.

The invention relates more particularly to the securing of the transmission of transactional data (for example a PIN (or Personal Identification Number) code) within the framework of a transaction, especially a payment transaction conducted jointly by a communications terminal enabling the entry of data and a card reader, especially a bank-card reader, connected to this communications terminal.

The invention has numerous applications, especially but not exclusively in commercial fields involving payment in a situation of mobility for which a pairing between a bank card reader (or payment terminal) and a communications terminal is a matter of interest.

2 TECHNOLOGICAL BACKGROUND

Payment in situations of mobility is a major factor of economic development. More particularly, there is an increasing number of situations in which a professional person needs to be able to make a payment transaction (for example a bank card payment) in a situation of mobility. Such a situation arises for example for professionals, such as members of the liberal professions, private chauffeurs and so on, who are constantly on the move for their work.

Such professionals especially, broadly termed here below as merchants, need to receive payments from their customers but do not necessarily have the possibility of getting equipped with independent payment terminals having capacities of nomad operation to receive such payments (for example due to the cost of such terminals).

For this reason, alternative solutions have been developed. This is for example the case with solutions proposed by the firm Square™. Thus a bank-card reader is proposed that gets connected to the jack connector of a communications terminal. Such a bank-card reader is presented for example in the patent document U.S. Pat. No. 9,324,100. This patent document more particularly describes a card reader positioned in a small-sized pack. A magnetic read head is configured to be coupled to a mobile device and the card reader has a slot for scanning a magnetic stripe of a card. The read head reads the data on the magnetic stripe and produces a signal representing data stored on the magnetic stripe. An output connector, in this case of the jack type, is adapted for being inserted into a port of the mobile device and delivers an output signal to the mobile device in question. As an alternative, solutions of connection by means of a USB (Universal Serial Bus) port are proposed instead of the use of the jack port.

Other solutions exist, especially to enable the use of a smartcard instead of (or as a complement to) a magnetic stripe card.

Besides, certain solutions do not require any physical connection between the communications terminal and the card reader; a wireless connection (for example of the Bluetooth type) can be envisaged. The drawback is that the card reader must be provided with its own power supply means.

These solutions however have a problem related to the absence of security or the low security of the payment data entered into the merchant's terminal itself.

Indeed, with certain types of magnetic stripe bank cards, a written signature is required in order to validate payment. In this case, the user uses a stylus and/or a finger to put a signature on the screen of the merchant's communications terminal. With other types of magnetic stripe bank cards, as also with smartcards, a personal identification code or PIN (Personal Identification Number) needs to be entered in order to validate the transaction. To enter this PIN code, the user uses a virtual keypad displayed on the screen of the communications terminal to enter his PIN code.

Such a personal identification element (PIN code or signature) entered on the screen of the terminal is then transmitted to the card reader which manages the secure ending of the transaction.

However, even when such a card reader possesses all the attributes enabling the secure management of the transaction in question (for example by integrating the functions required within a secure element as understood in the PCIPTS (Payment Card Industry Pin Transaction Security) standard), the merchant's mobile terminal does not, in principle, routinely integrate such elements.

This means that the transmission of personal identification information, entered on the terminal screen, to the card reader becomes a potentially weak link in the chain of secure processing of the transaction, since a third party can intercept the personal identification element in question.

There is thus a need for a solution for securing the transmission of data, for example the personal identification information entered on a terminal (especially a mobile terminal), to the card reader finalizing a transaction in order to ensure the integrity of the payment transaction in question.

3 SUMMARY

The invention thus proposes a method for securely receiving, in a card reader, at least one piece of data entered into a terminal connected to the card reader. Such a method comprises the following steps implemented by the card reader:

obtaining an encipherment key of the card reader, called a reader key;

encrypting the reader key by means of an authentic encipherment key, called an authentic key, shared between the card reader and an authentication server, delivering an encrypted reader key;

sending the encrypted reader key to the authentication server for transmission of the reader key from the authentication server to the terminal;

receiving an encrypted key sent by the authentication server, called an encrypted terminal key, the encrypted terminal key resulting from an encryption of an encipherment key obtained by the authentication server, called a terminal key, by means of the authentic key; and receiving at least one piece of encrypted data sent by the terminal, resulting from an encryption, by means of at least one reader key and of the terminal key, of the at least one piece of data.

Thus, the invention proposes a novel and inventive solution to enabling the secure reception, by the card reader, of data (for example a personal identification element of the PIN code, signature or other type) entered on the terminal to which the card reader is connected (for example via an entry on the touchpad screen of the terminal) so that the card reader in question can finalize the payment transaction.

To this end, the claimed technique proposes to take, as its basis, an authentic encipherment key, shared between the card reader and an authentication server for authenticating the cards in question, in order to enable the card reader and the terminal to make a secure exchange of the encipherment keys (i.e. the reader and terminal keys) to enable the securing of their subsequent exchanges.

For example, the sharing of the authentic key is done in the factory, during a step for recording the newly manufactured card reader in the authentication server. Thus it is ensured that the authentic key cannot be intercepted by a third party.

In one embodiment, the reader key and the terminal key are public keys for the implementing of an asymmetric encipherment protocol between the card reader and the terminal, the at least one piece of encrypted data resulting from an encryption implementing the asymmetric encipherment protocol.

Thus, the data exchanged between the terminal and the card reader are encrypted according to a robust and efficient technique based on the generation of a pair of public and private keys on either side of the transmission link to be secured, the public keys being exchanged between the two entities in question.

Besides, the claimed method makes it possible, through the use of the authentic key, to guarantee that no third party can intercept one of the public keys in question and substitute a fraudulent public key for it (such a fraudulent public key used by the card reader and/or the terminal enables a third party who knows the associated private key) to decrypt the encrypted messages by means of the fraudulent public key in question).

In one embodiment, the invention also comprises a step for obtaining at least one secret symmetrical key shared between the card reader and the terminal by implementation of a Diffie-Hellman type algorithm, at least one exchange of data between the card reader and the terminal for implementing the algorithm using the asymmetric encipherment protocol. The at least one piece of encrypted data results from an additional encryption by means of the secret symmetrical key.

Thus, the securing of the data exchanged between the card reader and the terminal is reinforced.

In one embodiment, the at least one piece of data is a piece of personal identification data entered on a touchpad screen of the terminal.

Thus, the card reader receives the personal identification data (for example the PIN code or the signature) entered on the screen of the terminal so as to be able to finalize the payment transaction securely.

In another embodiment of the invention, a method is proposed for securing a reception, in a card reader, of at least one piece of data entered on a terminal connected to the card reader. Such a method of securing comprises the following steps implemented by an authentication server of the card reader:

obtaining an encipherment key of the terminal, called a terminal key;

encrypting the terminal key by means of an authentic encipherment key, called an authentic key, shared between the card reader and the authentication server, delivering an encrypted terminal key;

sending the encrypted terminal key to the card reader;

receiving an encrypted reader key sent by the card reader, the encrypted reader key resulting from an encryption of an encipherment key of the card reader, called a reader key, by means of the authentic key; and transmitting the reader key to the terminal.

Thus, the invention also relates to a method for securing the reception, by the card reader, of data (for example a personal identification element such as a PIN code, signature, etc.) entered on the terminal to which the card reader is connected (for example through an entry on a touchpad screen of the terminal) in order to be able to finalize the payment transaction.

To this end, the claimed method proposes that an authentication server of the card reader will carry-out the exchange of encipherment keys (i.e. the reader and terminal keys) between the card reader and the application securely on the basis of an authentic key shared between the card reader and the server in question. As discussed here above, the sharing of the authentic key in question is done for example in the factory, during a step of registration of the key reader in the authentication server. It is thus ensured that the authentic key cannot be intercepted by a third party, thereby guaranteeing the secure exchange of the encipherment keys used by the card reader and the terminal for their exchanges.

In one embodiment, the obtaining comprises a reception of the terminal key sent by the terminal.

Thus, the terminal can generate an encipherment key at each new communications session with the card reader.

In other embodiments, such a terminal can be pre-defined and pre-stored in the authentication server through a step of referencing the terminal with the server. In this case, the key is obtained by the server via an identification of the terminal and the reading in memory of the corresponding terminal key.

In one embodiment, at least the transmissions of the reader key and/or of the reception of the terminal key implements a TLS (Transport Layer Security) protocol.

Thus, the exchange of information between the terminal and the authentication server is also secure even though the terminal does not share the authentic key with the authentication server.

In one embodiment of the methods of secure reception and of securing of reception, the authentic key is a basic authentic key. The step of encryption of the reader key and of the terminal key respectively comprises:

an updating of a key serial number delivering an updated key serial number; and a generation of an updated authentic key on the basis of the basic authentic key and of the updated key serial number, the encrypted reader key and the encrypted terminal key respectively being generated by means of the updated authentic key.

The step for sending the encrypted reader key to the authentication server and of the encrypted terminal key to the card reader respectively comprises a sending of the updated key serial number.

Thus, the authentic key is updated before each encryption of the reader key by the card reader or of the terminal key by the authentication server (for example at each start of a session of a communication between the card reader and the terminal in practice). The updated key serial number is then transmitted with the encrypted key (reader key or encrypted application key) in order to enable the device receiving the encrypted key to update the authentic key appropriately to verify the validity of the encrypted key in question.

In one embodiment of the methods of secure reception and of securing reception, the step of encryption of the reader key and of the terminal key respectively comprises a generation, by means of the authentic key or of the updated authentic key, of a code of authentication of a reader key message, and of the terminal key message respectively. The step for sending the encrypted reader key to the authentication server and of the encrypted terminal key to the card reader respectively comprises a sending of the message authentication code.

Thus, the encrypted reader key or terminal key is generated according to a tried and efficient technique.

In one embodiment of the methods of secure reception and of securing of reception, the step for sending the encrypted key to the authentication server and of the encrypted terminal key to the card reader respectively comprises a sending of the reader key and of the terminal key respectively. The step for receiving the terminal key encrypted by the card reader and the encrypted reader key encrypted by the authentication server respectively comprises:
- a generation of a candidate updated authentic key on the basis of the basic authentic key and of the updated key serial number sent by the authentication server and by the card reader respectively;
- a generation, by means of the candidate updated authentic key, of a code of authentication of a candidate message of the terminal key sent by the authentication server and by the card reader respectively; and
- a comparison of the candidate message authentication code and of the message authentication code sent by the authentication server and by the card reader respectively;

the terminal key sent by the authentication server and the reader key sent by the reader respectively being accepted by the card reader and by the authentication server respectively when the comparison indicates that the candidate message authentication code is identical to the message authentication code sent by the authentication server and the card reader respectively.

Thus, the comparison between the candidate message authentication code generated by means of the basic authentic key (shared between the card reader and the authentication server) and the received message authentication code enables the validation of the fact that the received reader key, the received terminal key respectively, is not a key substituted by a third party but truly the key that the card reader, the authentication server respectively, have sent.

In one embodiment of the methods for securely receiving and securing reception, the step of transmission, to the terminal, of the reader key is implemented when the comparison indicates that the candidate message authentication code is identical to the message authentication code sent by the card reader.

Thus, the authentication server sends the reader key to the terminal only when the validity of the reader key in question is proven.

In one embodiment of the methods of secure reception and of securing of a reception, the terminal is a smartphone.

In one embodiment of the methods of secure reception and of securing of reception, the card reader complies with a PCI PTS standard of payment transaction data processing.

The invention also relates to a computer program comprising program code instructions for implementing a method of secure reception or a method for securing reception (according to any one of the different embodiments) when it is executed on the computer.

In another embodiment of the invention, a device is proposed for secure reception, in a card reader, of at least one piece of data entered on a terminal connected to the card reader. Such a device comprises a reprogrammable computation machine or a dedicated computation machine configured to:
- obtain an encipherment key of the card reader called a reader key;
- encrypt the reader key by means of an authentic encipherment key called an authentic key shared between the card reader and the authentication server delivering an encrypted reader key;
- send the encrypted reader key to the authentication server for transmission of the reader key from the authentication server to the terminal;
- receive an encrypted key sent by the authentication server, called an encrypted terminal key, the decrypted terminal key resulting from an encryption of an encipherment key obtained by the authentication server, called a terminal key, by means of the authentic key; and
- receive at least one piece of encrypted data sent by the terminal resulting from an encryption by means of at least the reader key and the terminal key; of at least one piece of data.

Such a secure reception device is especially capable of implementing the method of secure reception according to the invention (according to any one of the different embodiments mentioned here above).

Thus, the characteristics and advantages of this device are the same as those of the method of secure reception described here above. They are therefore not described in more ample detail.

In another embodiment of the invention, a device is proposed to secure a reception, in a card reader, of at least one piece of data entered on a terminal connected to the card reader. Such a device comprises a reprogrammable computation machine or a dedicated computation machine configured to:
- obtain an encipherment key of the terminal, called a terminal key;
- encrypt the terminal key by means of an authentic encipherment key, called an authentic key, shared between the card reader and the authentication server delivering an encrypted terminal key;
- send the encrypted terminal key to the card reader;
- receive an encrypted reader key sent by the card reader, the encrypted reader key resulting from an encryption of an encipherment key of the card reader, called a reader key, by means of the authentic key; and
- transmit the reader key to the terminal.

Such a device for securing a reception is especially capable of implementing the method for securing reception according to the invention (according to any one of the different embodiments mentioned here above).

Thus, the characteristics and advantages of the device are the same as those of the method of securing reception described here above. They are therefore not described in more ample detail.

4 LIST OF FIGURES

Other features and advantages of the invention shall appear from the following description given by way of an indicatory and non-exhaustive example and from the appended drawings of which.

5 DETAILED DESCRIPTION OF THE INVENTION

In all the figures of the present document, the identical elements and steps are designated by a same reference.

The general principle of the described technique relies on the use of an authentic encipherment key shared between the card reader and an authentication server of the reader in question, in order to enable the exchange securely, via the authentication server in question, of specific encipherment keys between this card reader and a mobile terminal to which the card reader is connected.

For example, this sharing of the authentic key is done in the factory, during the manufacture of the card reader, in a step of registration of the card reader in question on the authentication server. As a result, it is made sure that the authentic key cannot be intercepted by a third party, thereby guaranteeing the secure exchange of the encryption keys used by the card reader and the terminal for their subsequent data exchanges.

Figure 1:
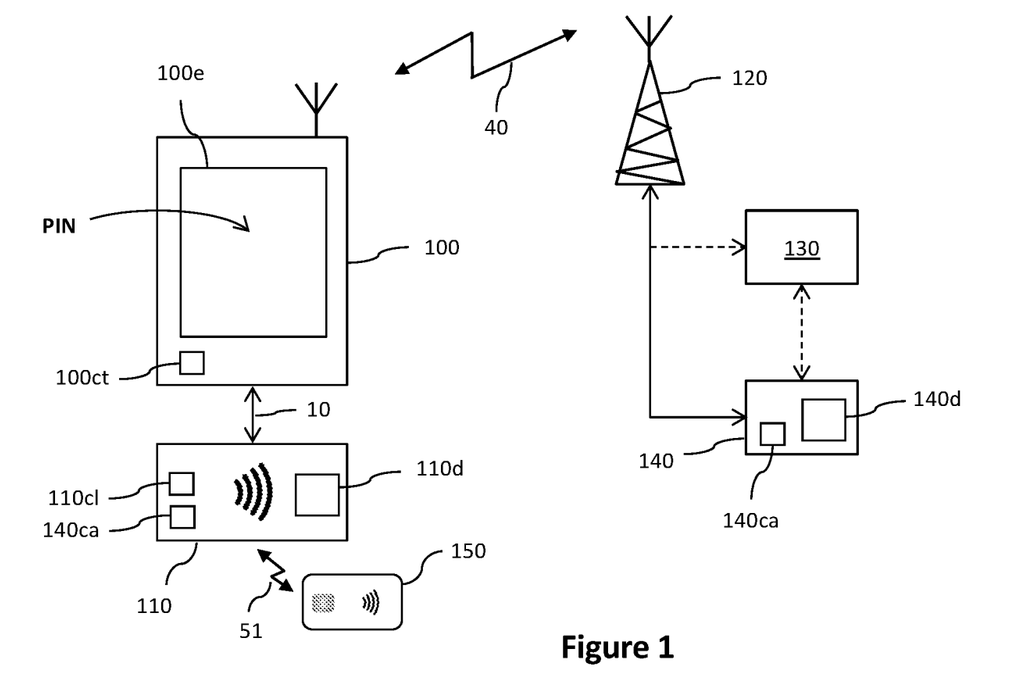
FIG. 1 illustrates a card reader connected to a terminal in communications with an authentication server of the card reader according to one embodiment of the invention.

Referring now to FIG. 1, we describe a card reader 110 connected to a terminal 100 in communication with an authentication server 140 of the card reader 110 according to one embodiment of the invention.

More particularly, the card reader 110 is a secure smart-card reader capable of finalizing a bank transaction with a server (not shown) of a bank concerned by the transaction in question. In this sense, the card reader 110 integrates all the corresponding security functions such as are required by the card payment industry. In particular, it integrates the security functions in question within a securing element as required by the PCI-PTS standards.

However, unlike known readers, the card reader 110 does not incorporate means for entering personal identification data, in this case the PIN code associated with the smartcard 150 that is read. On the contrary, the terminal 100, for example a smartphone, to which the card reader 110 is connected (10) (for example via a USB or jack type physical link or a Bluetooth type radio link) integrates a touchpad screen 100e on which the PIN code is entered. More particularly, an entry application is implemented on the terminal 100 in order to manage the secure entry of a PIN code on the touchpad screen 100e.

As a result, to make payment through his or her bank card 150, a user presents (51) this card to the card reader 110 but enters his or her PIN code on the touchpad screen 100e. The PIN code is then transmitted (100) to the card reader 110 in encrypted form as described in detail here below, so that this reader can finalize the payment transaction.

In variants, the bank card is a magnetic stripe card and the personal identification data can especially be either a user signature or a PIN code entered on the touchpad screen 100e.

In other variants, the card reader can integrate a character entry keypad, the PIN code being still entered on the touchpad screen 100e of the terminal 100 in order to finalize the bank transaction.

In other embodiments not shown, the PIN code (or more generally a piece of identification data) is entered not on the touchpad screen 100e but on a physical keypad of the terminal 100 or by any other appropriate means.

Whatever the embodiment or variant considered, the problem arises of the secure transmission of the personal identification data, entered on the terminal 100, to the card reader 110 so that this reader can finalize the payment transaction.

In order to secure this transaction, an encryption protocol based on the use of at least one encipherment key used by the terminal 100, called a terminal key 100ct, and a key used by the card reader 110, called a card reader key 110cl, is used by these two entities to encrypt the data that they exchange.

However, the card reader 110 does not have prior knowledge of the terminal 100 to which it will be connected and vice versa. As a result, there arises the problem of secure exchange of the two encipherment keys 110cl, 110ct at the time of the pairing of the card reader 110 and of the terminal 100 so that a third party cannot intercept them and/or substitute a fraudulent key for one of them or for both (for example by an attack called a middle-man attack).

To secure this exchange of the two encipherment keys 100cl, 100ct, the technique of the invention proposes that the card reader 110 should send the reader key 110cl to the terminal 100 (for example to the entry application that manages the secure entry of the PIN code on the touchpad screen 100e) via an authentication server 140 of the card reader 110. Conversely, the terminal 100 sends the terminal key 100ct to the card reader 100 via the authentication terminal 140 in question.

Indeed, as described here below with reference to FIGS. 2 and 3, the authentication server 140 and the card reader 120 share an authentic encipherment key, called an authentication key 140ca, used to secure the exchanges between these two entities. For example, the sharing of the authentic key 140ca is done in factory during a step of registration, on the authentication server 140, of the newly manufactured card reader 110. It is thus made sure that the authentic key 140ca cannot be intercepted by a third party, thereby guaranteeing the subsequent exchange, securely via the authentication server 140, of the encipherment keys 110cl, 100ct used by the card reader 110 and the terminal 100 for their exchanges.

Besides, the exchanges (40) between the authentic server 140 and the terminal 100, although not encrypted by means of the authentic key 100ca (a key that is unknown in principle to the terminal 100) is done via a internet connection secured for example by means of a TLS (Transport Layer Security) protocol.

Thus, the exchange of the reader key 100cl and terminal key 100ct is done in a securely from end to end.

Independently of the logic form (in terms of encryption, protocol, etc. as described here above) taken by the exchanges between the card reader 110, the terminal 100 and the authentication server 140, the data exchanged follows the physical link existing between the terminal 100 and the authentication server 140.

More particularly, the terminal 100 is a mobile terminal communicating according to a cell radiocommunications standard (for example 2G, 3G, 4G, etc.) with the base station 120 of the corresponding cell network. The data exchanged between the authentication server 140 and the terminal 100 (either addressed to the terminal 100 itself or addressed to the card reader 110, and on the basis of the encryption or of the security protocol corresponding to the destination in question as described here above) then follows the radio channel between these two entities.

In one variant, the data exchanged between the authentication server 140 and the terminal 100 travels (arrows shown in dots and dashes) through a management server 130 of the entry application which manages the secure entry of the PIN code on the touch pad screen 100e.

Figure 2:
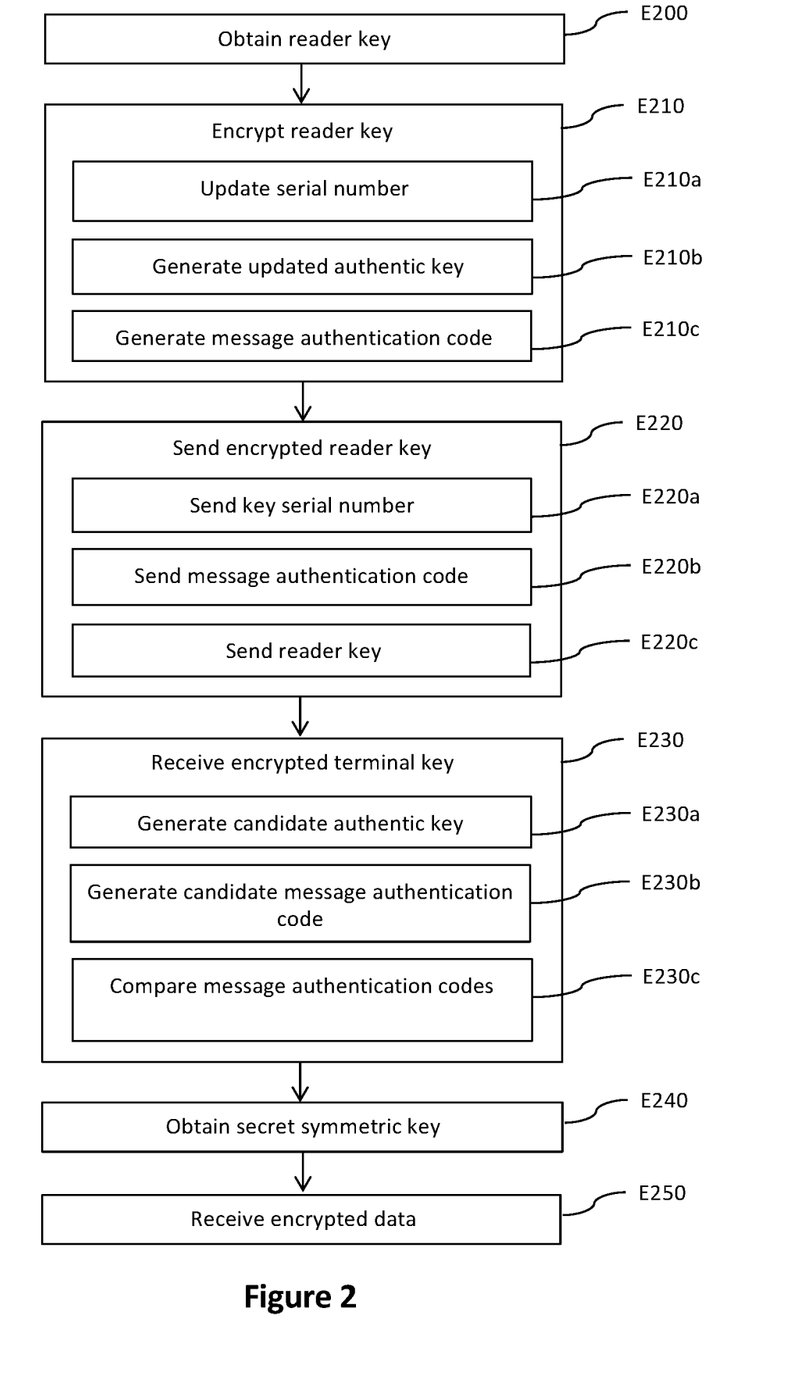
FIG. 2 illustrates steps of a method of secure reception, by the card reader of FIG. 1, of at least one piece of data entered on the terminal to which the card reader in question is connected according to one embodiment of the invention.
Figure 3:
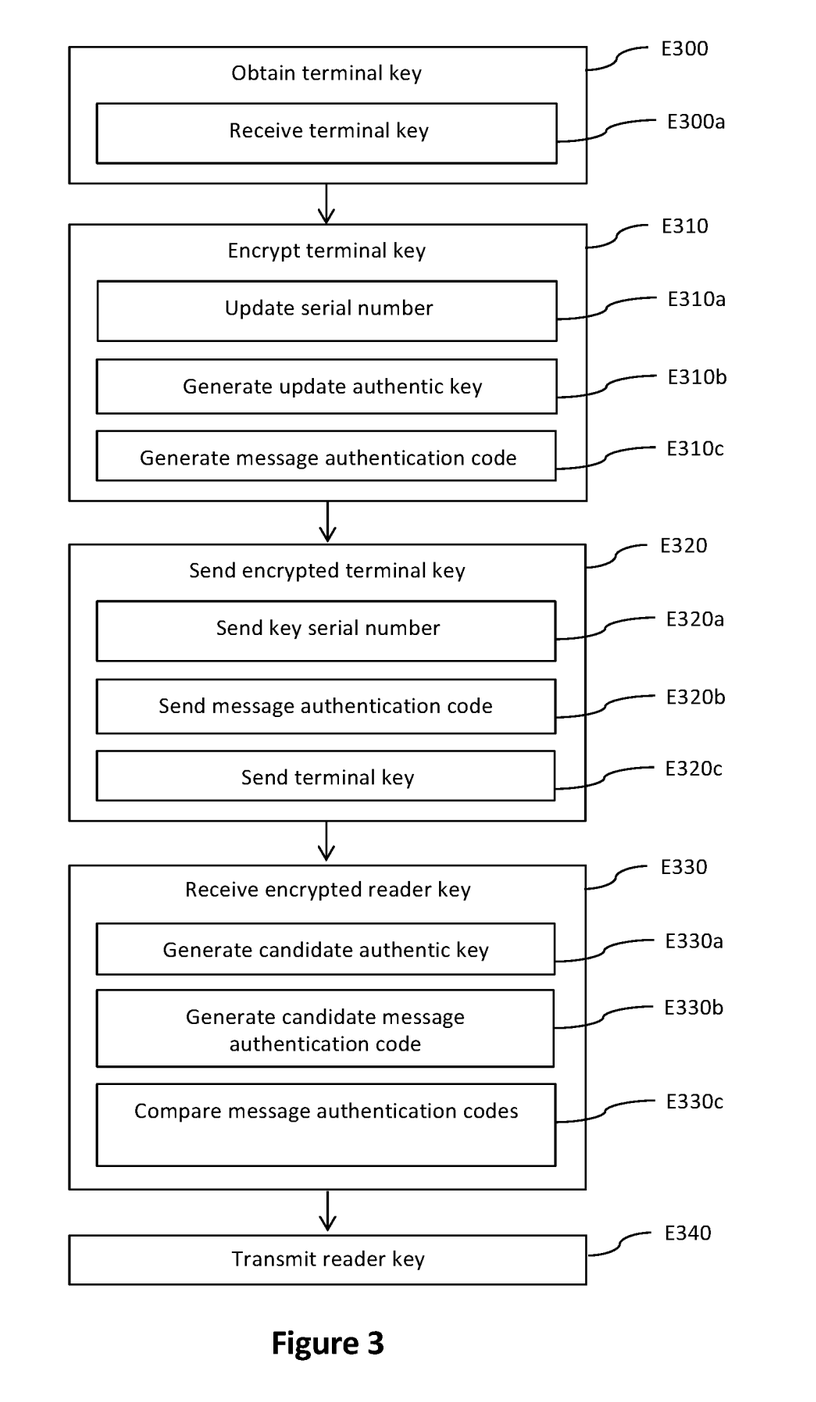
FIG. 3 illustrates steps of a method for securing reception, by the card reader of FIG. 1, of at least one piece of data entered on the terminal to which the card reader in question is connected according to one embodiment of the invention.

Referring to FIGS. 2 and 3, we now describe the steps of a method of secure reception (FIG. 2) as well as a method for securing reception (FIG. 3) by the card reader 110 of at least one piece of data entered on the terminal 100 according to one embodiment of the invention.

At a step E200 (FIG. 2) implemented by the card reader 110, the reader key 110cl is obtained by the card reader 100.

More particularly, the reader key 100cl is a public key associated with a private reader key in order to set up an asymmetric encipherment protocol for the exchange of data between the card reader 110 and the terminal 100.

In one variant, the pair constituted by the reader key 110cl and the associated private reader key is generated at each new session initiating a communications call with the terminal 100.

In another variant, the pair constituted by the reader key 100cl and the associated private reader key is pre-defined and installed in a secure memory of the card reader 110. Thus, the card reader 110cl is obtained by reading the secure memory in question in this variant.

At a step E210 (FIG. 2) implemented by the card reader 110, the reader key 110cl obtained during the step E200 is encrypted by the card reader 110 by means of the authentic key 140 CA shared with the authentic server 140. An encrypted reader key is thus delivered.

To this end, at a sub-step E210a, a key serial number is implemented at the start of the new session initiating a communication with the terminal 100.

At a sub-step E210b, an updated authentic key or session key is generated on the basis of the authentic key 140ca (which is then considered to be a basic authentic key) and of the updated key serial number delivered at the sub-step E210a. Such a generation of the updated authentic key is done for example according to the methods defined in the ANSI-X9.24-1 standard.

At a sub-step E210c, the encrypted reader key is generated in the form of a message authentication code of the reader key 110cl, by means of the updated authentic key. Such a generation of the message authentication code is done for example according to the method defined in the ISO 9797-1 standard.

At a sending step E220 (FIG. 2), the encrypted reader key delivered at the step E210 is sent to the authentication server 140 for subsequent transmission of the reader key 110cl from the authentication server 140 to the terminal 100.

More particularly, at a sub-step E220a, the updated key serial number delivered at the sub-step E210a is sent to the authentication server 140.

Similarly, at a sub-step E220b, the message authentication code of the reader key 110cl is also sent to the authentication server 140.

Finally, at a sub-step E220c, the reader key 100cl is also sent to the authentication server 140.

In certain embodiments (not shown), the three sending sub-steps E220a, E220b, E220c mentioned here above, are carried out in only one or two corresponding information-sending steps that are then combined for simultaneous sending.

From these three pieces of information, the authentication server 140 is then capable of verifying that the reader key 110cl received from the card reader 110 is truly the public key of the card reader 110 and not a key substituted by a third party.

To this end, at a reception step E330 (FIG. 3) implemented by the authentication server 140, the authentication server 140 receives the encrypted reader key.

More particularly, the reception step E330 comprises the following sub-steps in order to ascertain that the reader key 110cl is not a substituted key:

- at a sub-step E330a, an updated candidate authentic key is generated from the authentic key 140ca (which is then considered to be a basic authentic key) and from the updated key serial number received from the card reader 110. Such a generation is done on the basis of the same operations as those described here above with reference to the sub-step E210b of generation, by the card reader 110, of the updated authentic key or session key used for the encryption of the card reader 110cl;
- at a sub-step E330b, a candidate message authentication code of the card reader 110cl is generated by means of the updated candidate authentication key; and
- at a sub-step E330c, a comparison is made between the candidate message authentication code and the message authentication code.

More particularly, the card reader 110cl is accepted by the authentication server 140 when the two message authentication codes in question are identical. Indeed, in this case, it is made sure that the key received by the authentication server 140 during the reception step E330 is truly the reader key 110cl and therefore that this key had not been not substituted by a third party during transmission between the card reader 110 and the authentication server 140.

At a step E340 (FIG. 3) implemented by the authentication server 140, the authentication server 140 transmits the reader key 110cl received during the step E330 to the terminal 100.

More particularly, the step E340 is implemented when the sub-step E330c of comparison between the candidate message authentication code and the message authentication code indicates that the two message authentication codes in question are identical.

Besides, as described here above with reference to FIG. 1, the sending of the reader key 110cl by the authentication sever 140 to the terminal 100 is done through a connection secured by means of a TLS protocol. Hence, even when the exchange of data between the authentication server 140 and the terminal 100 is not encrypted by means of the authentic key 140c (a key that is unknown in principle to the terminal 100), the security of the transmitted data remains guaranteed.

Symmetrically with the steps E200, E210 and E230 implemented by the card reader 110 and described hereabove, the authentication server 140 for its part implements the steps E300, E310 and E330 (FIG. 3) to respectively obtain the terminal key 100*ct*, encrypt said key and send the encrypted terminal key thus obtained to the card reader 110.

More particularly, at the step E300 (FIG. 3), the authentication server 100 obtains the terminal key 100*ct*.

To this end, at a sub-step E300*a*, the authentication server 140 receives the terminal key 100*ct* sent by the terminal 100 via the connection secured by means of the TLS protocol as described here above.

More particularly, the terminal key 100*ct* is a public key associated with a private terminal key in order to set up an asymmetric encipherment protocol for the exchange of data between the card reader 110 and the terminal 100.

In one variant, the pair constituted by the terminal key 100*ct* and the associated private terminal key is generated at each new session initiating a communication with the terminal 100.

In other embodiments (not shown), the terminal key 100*ct* is pre-defined and pre-stored in the authentication server 140 via a step for referencing the terminal 100 with the authentication server 140. In this case, the terminal key 100*ct* is obtained by the authentication server 140 via an authentication of the terminal 100 and the reading in the memory of the corresponding terminal key 100*ct*.

Similarly, at a step E310 (FIG. 3), the authentication server 140 encrypts the terminal key 100*ct* obtained at the step E300 by means of the authentic key 140*ca* shared with the card reader 110. An encrypted terminal key is thus delivered.

The authentication server 140 then executes the same operations as those executed by the card reader 110 during the sub-steps E210A, E210B and E210C described here above.

More particularly, at a sub-step E310*a*, a key serial number is updated at the beginning of the new session initiating communication with the card reader 110.

At a sub-step E310*b*, an updated authentic key or session key is generated on the basis of the authentic key 140*ca* (which is then considered as a basic authentic key) and of the updated key serial number delivered during the sub-step E310*a*.

At a sub-step E310*c*, the encrypted terminal key is generated in the form of a message authentication code for authenticating the terminal key 100*ct* by means of the updated authentic key.

Finally, at a sending step E320 (FIG. 3), the encrypted terminal key delivered during the step E310 is sent to the card reader 110.

The authentication server 140 then executes the same operations as those executed by the card reader 110 during the sub-steps E220*a*, E220*b* and E220*c* described here above.

More particularly, at a sub-step E320*a*, the updated key serial number delivered during the sub-step E310*a* is sent to the card reader 110.

Similarly, at a sub-step E320*b*, the message authentication code of the terminal key 100*ct* is also sent to the card reader 110.

Finally, at a sub-step E320*c*, the terminal key 100*ct* is also sent to the card reader 110.

In certain embodiments (not shown) the three sending sub-steps E320*a*, E320*b*, E320*c* mentioned here above are performed in only one or two corresponding information-sending steps which are then combined for simultaneous dispatch.

Following the sending step E320 implemented by the authentication server 140, the card reader 110 is capable of verifying, from the three items of information received, that the terminal key 100*ct* received from the authentication server 140 is truly the public key of the terminal 100, and not a key substituted by a third party.

To this end, the card reader 110 then executes the same operations as those executed by the authentication server 140 during the sub-steps E330*a*, E330*b* and E330*c* described here above.

More particularly, at a reception step E230 (FIG. 2), the card reader 110 receives the terminal key 100*ct* in encrypted form. This key is called an encrypted terminal key, and is sent by the authentication server 140. Such a reception step E230 comprises the following sub-steps to ascertain that the terminal key 100*ct* is not a substituted key:

at a sub-step E230*a*, an updated candidate authentic key is generated on the basis of the authentic key 140*ca* (which is then considered to be a basic authentic key) and of the updated key serial number received by the authentication server 140;

at a sub-step E230*b*, a candidate message authentication code of the terminal key 100*ct* is generated by means of the updated candidate authentic key; and at a sub-step E230*c*, a comparison is made between the candidate message authentication code and the message authentication code.

More particularly, the terminal key 100*ct* is accepted by the card reader when the two message authentication codes in question are identical. Indeed, in this case it is ensured that the key received by the card reader 110 during the reception step E230 is truly the terminal key 100*ct* and therefore that this key has not been substituted by a third party.

At the end of the implementing of the above-mentioned steps, the card reader 110 has securely obtained the terminal key 100*ct* and the terminal 100 has securely obtained the reader key 100*cl*. Thus, the exchange of data in encrypted form between the terminal 100 and the card reader 110 can start on the basis of the asymmetric encipherment protocol based on the public terminal key 100*ct* and public reader key 100*cl*. In particular, the card reader 110 is capable of securely receiving the PIN code entered by the user on the screen 100*e* of the terminal 100.

However, in order to further reinforce the securing of data exchanges between the card reader 110 and the terminal 100, the card reader 110 implements an additional step E240 (FIG. 2) for obtaining a secret symmetrical key shared between the card reader 110 and the terminal 100. Such an obtaining step is based on a Diffie-Hellman type algorithm (as defined for example in the ANSI X9.42 standard) involving data exchanges between the card reader 110 and the terminal 100. The exchanges in question then use the asymmetric encipherment protocol based on the public keys exchanged between the terminal 100 and the card reader 110, i.e. the terminal key 100*ct* and the reader key 100*cl*.

At a step E250, the card reader 110 receives the data in encrypted form from the terminal 100. These data are, for example the PIN code entered on the touchpad screen 100*e* of the terminal 100.

Such data are encrypted through the use of asymmetric encrypted protocols mentioned here above, considered alone or in combination with the additional encipherment based on the secret symmetrical key.

Thus the card reader 110 is capable of finalizing the payment transaction securely manner with a server of a bank concerned by the transaction in question.

Figure 4:
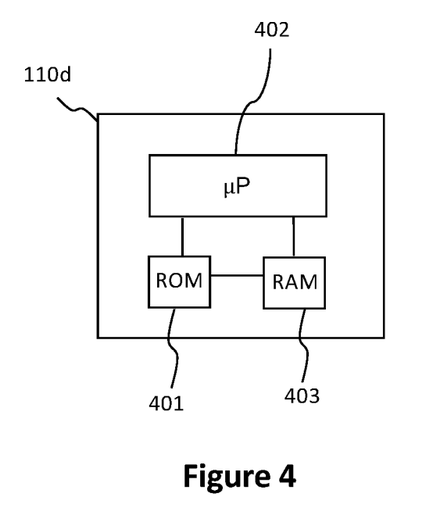
FIG. 4 presents a simplified example of a structure of a device to implement the method of secure data reception of FIG. 2.

FIG. 4 presents an example of a structure of a device 110*d* for the secure reception, in the card reader 110, of at least one piece of data entered on the terminal 100. More particularly, such a device 110d enables the implementation of the method of FIG. 2. The device 110d comprises a random-access memory 403 (for example a RAM), a processing unit 402 equipped for example with a processor and driven by a computer program stored in a read-only memory 401 (for example a ROM or hard disk drive). At initialization, the code instructions of the computer program are for example loaded into the random-access memory 403 and then executed by the processor of the processing unit 402.

This FIG. 4 illustrates only one particular way, amongst several possible ways, of setting up the means comprised in the device 110d so that it performs certain steps of the method described in detail here above, with reference to FIG. 2 (in any one of the different embodiments). Indeed, these steps can be performed equally well on a reprogrammable computing machine (a PC computer, a DSP processor or a microcontroller) executing a program comprising a sequence of instructions or on a dedicated computation machine (for example a set of logic gates such as an FPGA or an ASIC or any other hardware module). Should the means comprised in that device 100d be made with a reprogrammable computation machine, the corresponding program (i.e. the sequence of instructions) could be stored in a storage medium that is detachable (such as for example a floppy disk, a CD-ROM or a DVD-ROM) or not detachable, this storage medium being partially or totally readable by a computer or a processor.

In the embodiment illustrated in FIG. 1, such a device 100d is comprised in the card reader 110.

In certain variants, the device 110d is integrated within a securing element as required by the PCI PTS standards.

Figure 5:
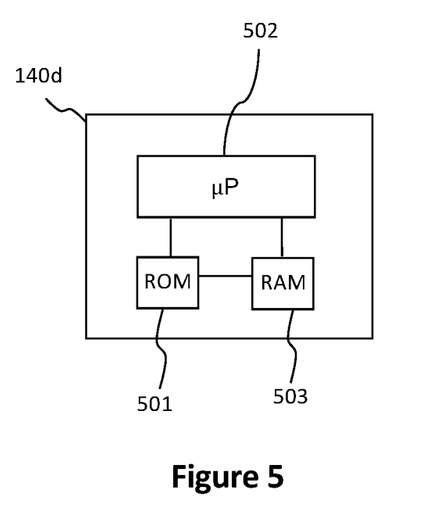
FIG. 5 presents a simplified example of a structure of a device to implement the method of FIG. 3 for securing the reception of data.

FIG. 5 presents an example of a structure of a device 140d for securing a reception, in the card reader 110, of at least one piece of data entered on the terminal 100. More particularly, such a device 140d enables the implementing of the method of FIG. 3. The device 140d comprises a random-access memory 503 (for example a RAM), a processing unit 402 equipped for example with a processor and driven by a computer program stored in a read-only memory 501 (for example a ROM or hard disk drive). At initialization, the code instructions of the computer program are for example loaded into the random-access memory 503 and then executed by the processor of the processing unit 502.

This FIG. 5 illustrates only one particular way, amongst several possible ways, of setting up the means comprised in the device 140d so that it performs certain steps of the method described in detail here above, with reference to FIG. 3 (in any one of the different embodiments). Indeed, these steps can be performed equally well on a reprogrammable computing machine (a PC computer, a DSP processor or a microcontroller) executing a program comprising a sequence of instructions or on a dedicated computation machine (for example a set of logic gates such as an FPGA or an ASIC or any other hardware module). Should the means comprised in that device 140d be made with a reprogrammable computation machine, the corresponding program (i.e. the sequence of instructions) could be stored in a storage medium that is detachable (such as for example a floppy disk, a CD-ROM or a DVD-ROM) or not detachable, this storage medium being partially or totally readable by a computer or a processor.

In the embodiment illustrated in FIG. 1, such a device 140d is comprised in the card reader 140.

In certain variants, the device 140d is integrated within a securing element as required by the PCI PTS standards.

The invention claimed is:

1. A method for securely receiving, in a card reader, at least one piece of data entered into a terminal connected to said card reader, wherein the method comprises the following acts implemented by said card reader:
    obtaining an encipherment key of said card reader, called a reader key;
    encrypting said reader key by using an authentic encipherment key, called an authentic key, shared between said card reader and an authentication server, delivering an encrypted reader key;
    sending said encrypted reader key to said authentication server for transmission of said reader key from said authentication server to said terminal;
    receiving an encrypted key sent by said authentication server, called an encrypted terminal key, said encrypted terminal key resulting from an encryption of an encipherment key obtained by said authentication server, called a terminal key, by using said authentic key, wherein said terminal key and said reader key are public keys for implementing an asymmetric encipherment protocol between said card reader and said terminal; and
    receiving at least one piece of encrypted data sent by said terminal, resulting from an encryption of said at least one piece of data, said encryption implementing said asymmetric encipherment protocol and using at least said reader key and said terminal key.

2. The method according to claim 1 further comprising:
    obtaining at least one secret symmetrical key shared between said card reader and said terminal by implementation of a Diffie-Hellman type algorithm, at least one exchange of data between said card reader and said terminal for the implementation of the algorithm using said asymmetric encipherment protocol,
    and wherein said at least one piece of encrypted data is a piece of personal identification data entered on a touchpad screen of said terminal.

3. The method according to claim 1, wherein said at least one piece of data is a piece of personal identification data entered on a touchpad screen of said terminal.

4. The method according to claim 1, wherein said authentic key is a basic authentic key,
    and wherein said act of encrypting said reader key comprises:
    updating a key serial number delivering an updated key serial number; and
    generating an updated authentic key on the basis of said basic authentic key and said updated key serial number, said encrypted terminal key being generated by using said updated authentic key;
    and wherein said act of sending said encrypted reader key to said authentication server comprises sending said updated key serial number.

5. The method according to claim 1, wherein said act of encrypting said reader key comprises encrypting said reader key by using said authentic key, delivering the encrypted reader key in the form of a message authentication code for said reader key,
    and wherein said act of sending said encrypted reader key to said authentication server comprises sending said encrypted reader key in the form of said message authentication code.

6. A device of securely receiving, in a card reader, at least one piece of data entered on a terminal connected to said card reader, wherein the device comprises:
    a reprogrammable computation machine or a dedicated computation machine configured to:

obtain an encipherment key of said card reader called a reader key;

encrypt said reader key by using an authentic encipherment key called an authentic key shared between said card reader and an authentication server, delivering an encrypted reader key;

send said encrypted reader key to said authentication server for transmission of said reader key from said authentication server to said terminal;

receive an encrypted key sent by said authentication server, called an encrypted terminal key, said encrypted terminal key resulting from an encryption of an encipherment key obtained by said authentication server, called a terminal key, by using said authentic key, wherein said terminal key and said reader key are public keys for implementing an asymmetric encipherment protocol between said card reader and said terminal; and receive at least one piece of encrypted data sent by said terminal, resulting from an encryption of said at least one piece of data, said encryption implementing said asymmetric encipherment protocol and using at least said reader key and said terminal key.

7. A device of securely receiving, in a card reader, at least one piece of data entered on a terminal connected to said card reader, wherein the device comprises:

a reprogrammable computation machine or a dedicated computation machine configured to:

obtain an encipherment key of said card reader called a reader key;

encrypt said reader key by using an authentic encipherment key called an authentic key shared between said card reader and an authentication server, delivering an encrypted reader key;

send said encrypted reader key to said authentication server for transmission of said reader key from said authentication server to said terminal;

receive an encrypted key sent by said authentication server, called an encrypted terminal key, said encrypted terminal key resulting from an encryption of an encipherment key obtained by said authentication server, called a terminal key, by using said authentic key; and receive at least one piece of encrypted data sent by said terminal, resulting from an encryption of said at least one piece of data, said encryption implementing an asymmetric encipherment protocol and using at least said reader key and said terminal key, wherein said at least one piece of data is a piece of personal identification data entered on a touchpad screen of said terminal.

8. A device of securely receiving, in a card reader, at least one piece of data entered on a terminal connected to said card reader, wherein the device comprises:

a reprogrammable computation machine or a dedicated computation machine configured to:

obtain an encipherment key of said card reader called a reader key;

encrypt said reader key, by using an authentic encipherment key called an authentic key shared between said card reader and an authentication server, delivering an encrypted reader key in the form of a message authentication code for said reader key;

send said encrypted reader key in the form of said message authentication code to said authentication server for transmission of said reader key from said authentication server to said terminal;

receive an encrypted key sent by said authentication server, called an encrypted terminal key, said encrypted terminal key resulting from an encryption of an encipherment key obtained by said authentication server, called a terminal key, by using said authentic key; and receive at least one piece of encrypted data sent by said terminal, resulting from an encryption of said at least one piece of data, said encryption implementing an asymmetric encipherment protocol and using at least said reader key and said terminal key.

* * * * *